US005679996A

United States Patent [19]

Strobl

[11] Patent Number: 5,679,996

[45] Date of Patent: Oct. 21, 1997

[54] ASSEMBLED COMMUTATOR

[75] Inventor: Georg Strobl, Frauenkopfe, Germany

[73] Assignee: Johnson Electric S.A., Switzerland

[21] Appl. No.: 472,435

[22] Filed: Jun. 7, 1995

Related U.S. Application Data

[63] Continuation-in-part of Ser. No. 353,890, Dec. 12, 1994, which is a continuation of Ser. No. 37,222, Mar. 26, 1993, Pat. No. 5,373,209.

[30] Foreign Application Priority Data

Apr. 25, 1992 [GB] United Kingdom .................... 9208980

[51] Int. Cl.$^{6}$ ............................ H01R 39/06; H02K 13/04

[52] U.S. Cl. ........................... 310/237; 310/231; 310/233; 310/234; 310/237; 310/71

[58] Field of Search .................................... 310/234, 237, 310/71, 231, 232

[56] References Cited

U.S. PATENT DOCUMENTS 4,584,498 4/1986 Strobl ..................................... 310/236
4,656,380 4/1987 Strobl ..................................... 310/236
4,757,602 7/1988 Evenson .................................... 29/597
4,769,627 9/1988 Baines ....................................... 310/71
4,881,000 11/1989 Wang ..................................... 310/234
4,927,379 5/1990 Wang et al. ............................ 439/298
4,983,871 1/1991 Strobl ..................................... 310/234
5,373,209 12/1994 Strobl et al. ........................... 310/234

*Primary Examiner*—Steven L. Stephan
*Assistant Examiner*—Elvin G. Enad
*Attorney, Agent, or Firm*—Ostrolenk, Faber, Gerb & Soffen, LLP

[57] ABSTRACT

An assembled commutator has a segment support portion and a housing portion. The housing portion has housing members formed with axially extending "T"-shaped recesses and transversely extending slots for receiving armature leads. Insulation displacing terminals are inserted in the "T"-shaped recesses and formed with slots which cooperate with the transversely extending housing slots to grip and contact the armature leads. The terminals may also be formed with recesses for receiving armature leads after the terminals have been placed in the housing portion and during the winding of the rotor. The terminals are held in place by commutator segments and include recesses for receiving retainers located on the commutator segments. The commutator segments may also include a carbon portion which surrounds a copper connection strip for connecting the terminals to the carbon portion of the commutator segment.

13 Claims, 6 Drawing Sheets

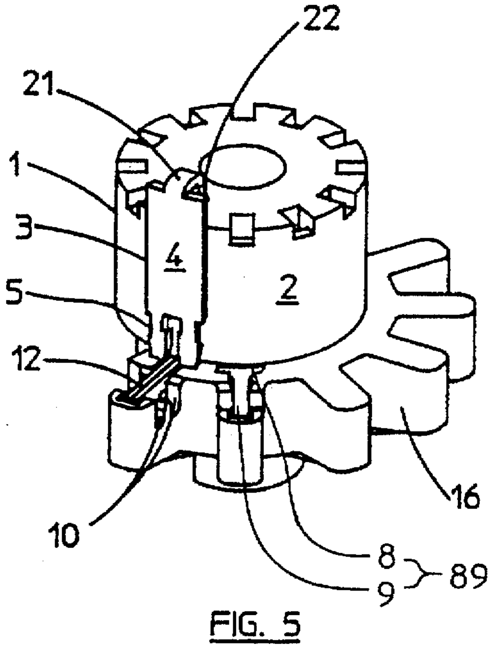
FIG. 5
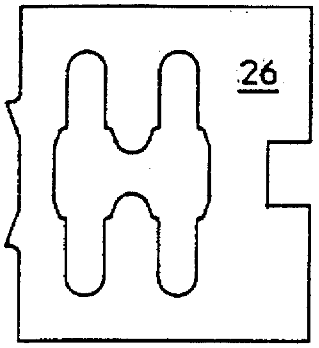
FIG. 6
FIG. 8
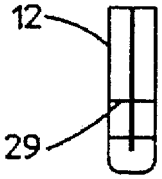
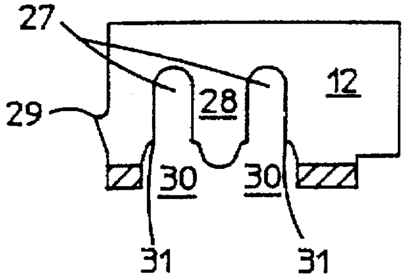
FIG. 7
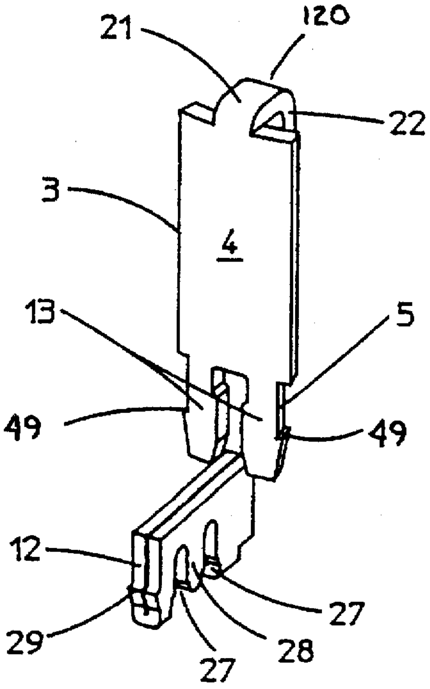
FIG. 9
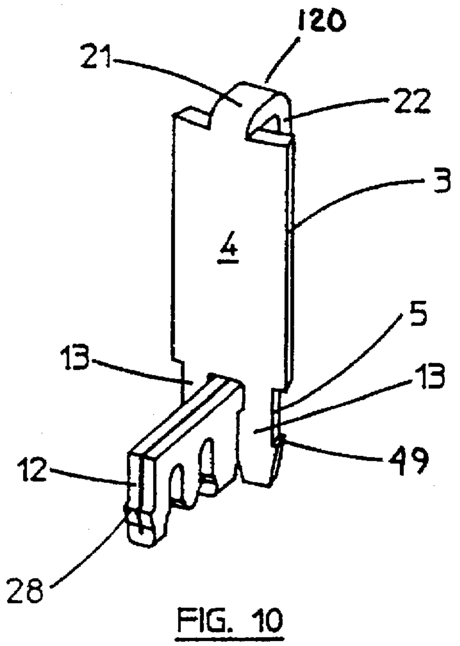
FIG. 10

ASSEMBLED COMMUTATOR

This application is a Continuation-In-Part of U.S. patent application Ser. No. 08/353,890 filed on Dec. 12, 1994 which is a Continuation of U.S. patent application Ser. No. 08/037,222 filed on Mar. 26, 1993, now U.S. Pat. No. 5,373,209.

FIELD OF THE INVENTION

The present invention relates to an assembled commutator in which, in contrast to a molded commutator in which the metal components are inserts in the molded insulating base of the commutator, the base of the commutator and the metal components are formed separately and then assembled together.

In particular, the invention relates to an assembled commutator provided with insulation displacing terminals for connecting to the armature leads which, upon engagement with the leads, slice through the insulation provided on the leads and into the surfaces of the conductive wire cores of the leads.

DESCRIPTION OF THE PRIOR ART

European Patent Specification No. 106,444 discloses an assembled commutator including an insulating cylindrical portion having an outer support surface; at least three commutator segments each having an arcuate brush contact portion seated on the support surface; an insulating housing portion having at least three housings each formed with axially extending recesses and with positioning means for armature leads; and at least three slotted insulation displacing terminals disposed in the recesses so as to cooperate with the positioning means to make electrical contact with the armature leads.

In this form of construction, the commutator segments are formed integrally with the terminals. These composite components and the commutator base comprising the insulating cylindrical portion and insulating housing portion are shaped so that each of the composite components can be positioned on the commutator base in a single translational movement in which the composite component is moved relative to the commutator base and in which cutting edges provided on the terminals of the composite components slice through insulation provided on the armature leads and into the conductive wire cores of these leads.

Although this form of construction permits automated assembly of the commutator, the necessary simultaneous alignment of different parts of the composite components with associated parts of the commutator base is difficult. Moreover, because the arcuate portions of the commutator segments are required to make good electrical contact with the brushes of an electric motor and the terminals are required to cut through insulation and the outer surfaces of armature lead wires, it is not always easy to provide a composite component of material having optimal properties for both of these purposes.

Additionally, a similar size and type rotor using a different size wire for the armature winding requires a different housing and a different set of segments in order to vary the size of the insulation displacing slots to accommodate the different size wire.

BRIEF SUMMARY OF THE INVENTION

It is an object of the present invention to provide an assembled commutator in which the difficulties encountered with conventional assembled commutators are overcome.

This object is achieved by providing an assembled commutator in which each commutator segment has a retainer extending axially from one end of the brush contact portion into a respective one of the recesses and physically contacting the terminal disposed therein to provide electrical connections between the armature leads and respective commutator segments. Thus, according to the invention, there is provided an assembled commutator including a support portion; a plurality of commutator segments mounted on said support portion; a housing connected to said support portion and including a plurality of first recesses for receiving armature leads; a plurality of terminals disposed within said housing and including a plurality of second recesses for receiving said armature leads, said first and second recesses being located such that when said armature leads are wound onto said housing and said terminals, said armature leads are received in said first and second recesses, said plurality of terminals being disposed in contact with said plurality of commutator segments to electrically connect said armature leads to said commutator segments.

According to another embodiment of the present invention, there is provided a support portion; a plurality of commutator segments mounted on said support portion; a housing connected to said support portion for receiving armature leads; a plurality of terminals disposed within said housing and in contact with said plurality of commutator segments to electrically connect said plurality of armature of leads to said commutator segments; wherein each of said terminals includes a recess formed therein for receiving a portion of a respective one of said commutator segments.

With this form of construction, the terminals may be inserted in the recesses in one operation and the retainers of the commutator segments may be inserted in the recesses in a subsequent operation. This not only simplifies assembly, it permits more care to be taken to ensure proper insulation displacement during insertion of the terminals into the recesses.

In a preferred embodiment, the commutator segments and the terminals are made of different materials. Thus, for example, the commutator segments may be made of copper for good conductivity, whereas the terminals may be made from brass, which is harder than copper, to provide good cutting edges for insulation displacement and cutting engagement with the outer surfaces of the wire cores of the armature leads.

According to one form of construction, the terminals include laminated elements disposed in angularly-spaced radial planes. The retainers may be formed as rectangularly shaped members which fit within recesses formed in the terminals.

To facilitate manufacture, each terminal is preferably formed from a single piece of stamped and folded sheet material, because it is easier to stamp the thinner sheet metal, even though the shear cut is twice as long. This is of particular importance when cutting slots for engagement with small diameter wires because the thickness of the sheet metal preferably should be less than the width of the slots being stamped in the sheet metal.

Although the segment support portion and the housing portion may form integral parts of a commutator base, difficulty is encountered in molding this relatively bulky and complicated component and so it is preferred that the segment support portion and the housing portion are formed as separate elements which are subsequently interconnected.

With this form of construction, it is therefore possible to fit the housing portion of the commutator to the armature of an electric motor and to make electrical connections between the armature leads and the terminals before fitting the segment support portion, thus allowing more room for the insertion of the terminals into the recesses in the housing portion and thereby simplifying this operation.

Another advantage of this construction of the invention is that the segments and the segment support portion can be made standard for a commutator having a particular number of segments with the housing portion, if necessary, and the terminals being changed to accommodate armature windings of different size wire. At the same time, the terminals can be standardized for the same size armature winding wire regardless of the actual number of poles of the armature.

It should be noted that the terminals may be fitted to the housings before or after the armature has been wound depending on the orientation of the terminals. However, post wind fitting is preferred as this gives greater reliability and mechanical protection to the connection between the terminal and the armature lead.

Several embodiments of the invention are hereinafter described, by way of example only, with reference to the accompanying drawings. While the invention is described in relation to a cylindrical commutator, it should be realized that the invention is equally applicable to face plate or planar commutators.

BRIEF DESCRIPTION OF THE DRAWINGS

FIG. 5 is a schematic isometric view similar to FIG. 4 but showing a terminal fitted and a commutator segment positioned for assembly with the cylindrical and housing portions;

FIG. 6 is a blank, stamped from a sheet of brass, for use in forming a terminal as shown in FIG. 5;

FIGS. 7 and 8 are side and end elevation views of a terminal formed from the blank shown in FIG. 6;

FIGS. 9 and 10 are schematic isometric views of a commutator segment and a terminal before and after assembly of the commutator segment with the terminal wherein the cylindrical and housing portions are not shown for clarity;

DETAILED DESCRIPTION OF THE PREFERRED EMBODIMENTS

Figure 1:
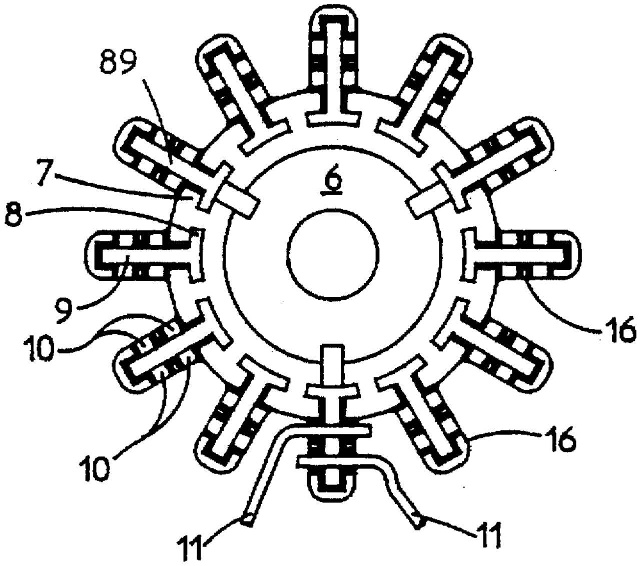
FIGS. 1 and 2 are an axial end elevation and a sectional side elevation of a housing portion of an assembled cylindrical commutator according to a preferred embodiment of the invention.
Figure 2:
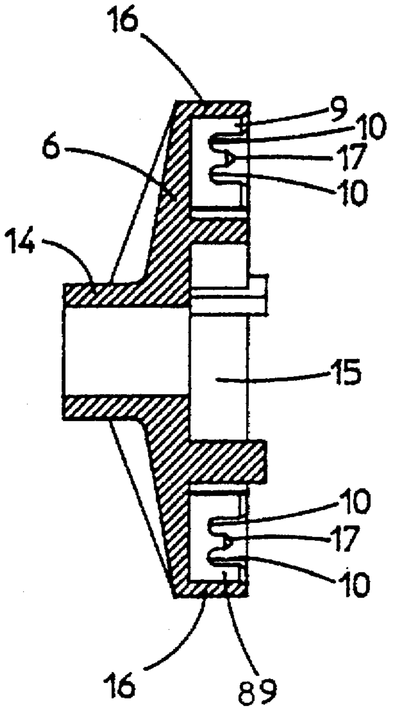

As shown in FIGS. 1 and 2, a circular housing portion 6 comprises a hub 14 supporting an annular ring 15 with twelve radial projections 16 which, together with the annular ring 15, form twelve housings 7 which each enclose a "T"-shaped recess 89 having an inner, circumferentially extending portion 8 and an outer radially extending portion 9.

The radial projection 16 of each housing 7 is formed with two transversely extending slots 10, separated by a divider 17, which serves as a positioning member for positioning armature leads 11 (only two of which are shown in FIG. 1) relative to the housing 7.

In assembling an electric motor, a housing portion 6 (only partially shown in FIGS. 3 to 5) is mounted on the shaft of the motor, adjacent the armature, and secured in place by glue or some other fastening means. A cylindrical segment support portion 1 is then connected to the housing portion 6 by an axially extending connector 18 which is received by the annular ring 15, as shown in FIGS. 3 and 4.

The housing portion 6 is also formed with three equiangularly-spaced projections 19 extending both radially and axially into complementary recesses 20 formed in the cylindrical portion 1 to lock the cylindrical portion 1 and housing portion 6 together.

Each commutator segment 3 is preferably stamped from a copper sheet, typically 0.8 mm thick, and, as shown in FIGS. 5, 9 and 10, has an arcuate portion 4 seated on the outer support surface 2 of the cylindrical portion 1, a retainer 5 at one end of the arcuate portion 4, and a hook 120 having a radially inwardly extending portion 21 and an axially extending portion 22 at the other end. These hook portions 21, 22 are received within twelve circumferentially-spaced radially-extending notches 23 formed in the outer end 24 of the cylindrical portion 1 and within axially extending recesses 25 which communicate with the radially inner ends of the notches 23.

Figure 3:
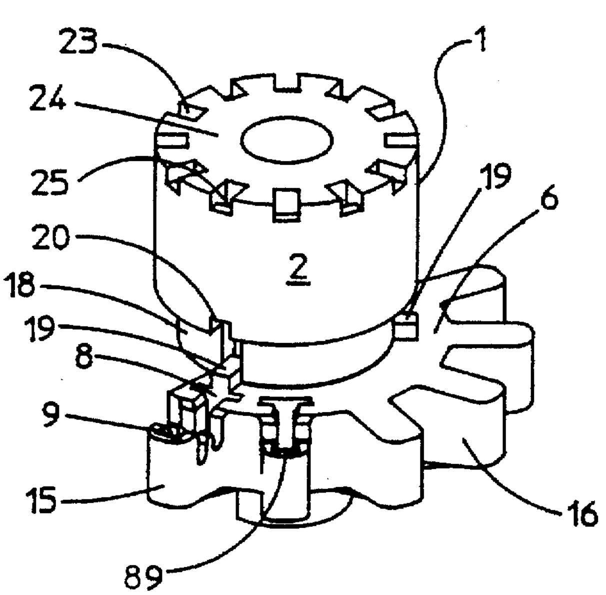
FIGS. 3 and 4 are schematic isometric views of a cylindrical segment support portion of an assembled commutator in relation to a housing portion, as shown in FIGS. 1 and 2, at two different stages in the assembly of the commutator with the housing portion partially shown for clarity.
Figure 4:
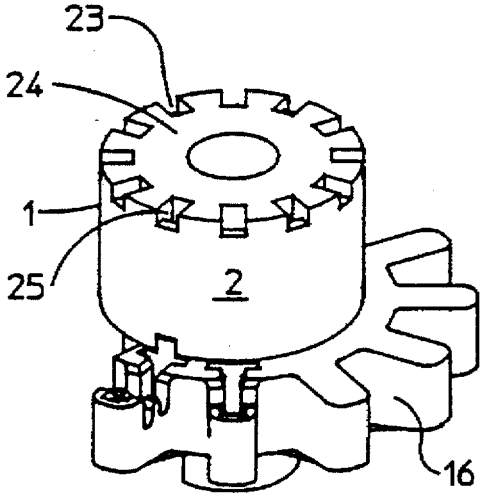

After the cylindrical portion 1 has been fitted to the housing portion 6, as shown in FIGS. 3 and 4, terminals 12 are inserted in the outer, radially-extending portions 9 of the recesses 89 and extend across the inner circumferentially-extending portions 8. Commutator segments 3 are then positioned on the outer support surface 2 of the cylindrical portion 1 and moved axially into their assembled positions as schematically illustrated in FIGS. 9 and 10.

As shown in FIG. 6, each terminal blank 26 is preferably stamped from a thin sheet of brass, typically 0.5 mm thick, and folded as shown in FIGS. 7 and 8 to form a two-layer terminal 12 having two slots 27, separated by a divider 28, and a barb 29 at its radially outer end for retaining engagement with the radially outer end of the recess 89 in which the terminal 12 is inserted. Each slot 27, typically 0.85 mm wide, for accommodating a 1 mm diameter armature lead 11, has a convergent mouth 30 and two sharp edges 31.

During winding of the armature, armature leads 11 are placed across the face of the housings 7 and held in position by the transversely extending slots 10. The slots 10 and divider 17 of each housing 7 support at least one armature lead 11 while the terminal 12 is being inserted. During this operation, the sharp edges 31 slice through insulation on each lead 11 and into the outer layer of the wire core of the lead 11. The slots 27 and divider 28 in the terminal 12 then cooperate with the slots 10 and divider 17 to grip each of the leads 11 supported by the slots 10 and divider 17.

As shown in FIGS. 9 and 10, each retainer 5 is a forked member having two prongs 13 which straddle a terminal 12 inserted in a recess 89 and are received in the inner circumferentially-extending portion 8 of the recess 89. As shown, the outer edges of the prongs 13 are formed with barbs 49 and converge to provide a tapered retainer 5. Thus, when the prongs 13 are inserted into the inner recess portion 8, on opposite sides of the terminal 12, the tapering end of the retainer 5 cooperates with the substantially parallel side walls of the inner recess portion 8 to press the prongs 13 towards each other, to clamp the radially inner end of the terminal 12. At the same time, the barbs 49 bite into these side walls to resist axial removal of the commutator segment 3. The terminal 12 is therefore securely held in place by the barb 29, at its radially outer end, and by the barbs 49 on the prongs 13, at the other end.

A similar barb, not shown, can also be provided on the free end of each axially extending hook portion 22, for locking engagement with the internal surface of an axially extending recess 25.

Figure 11:
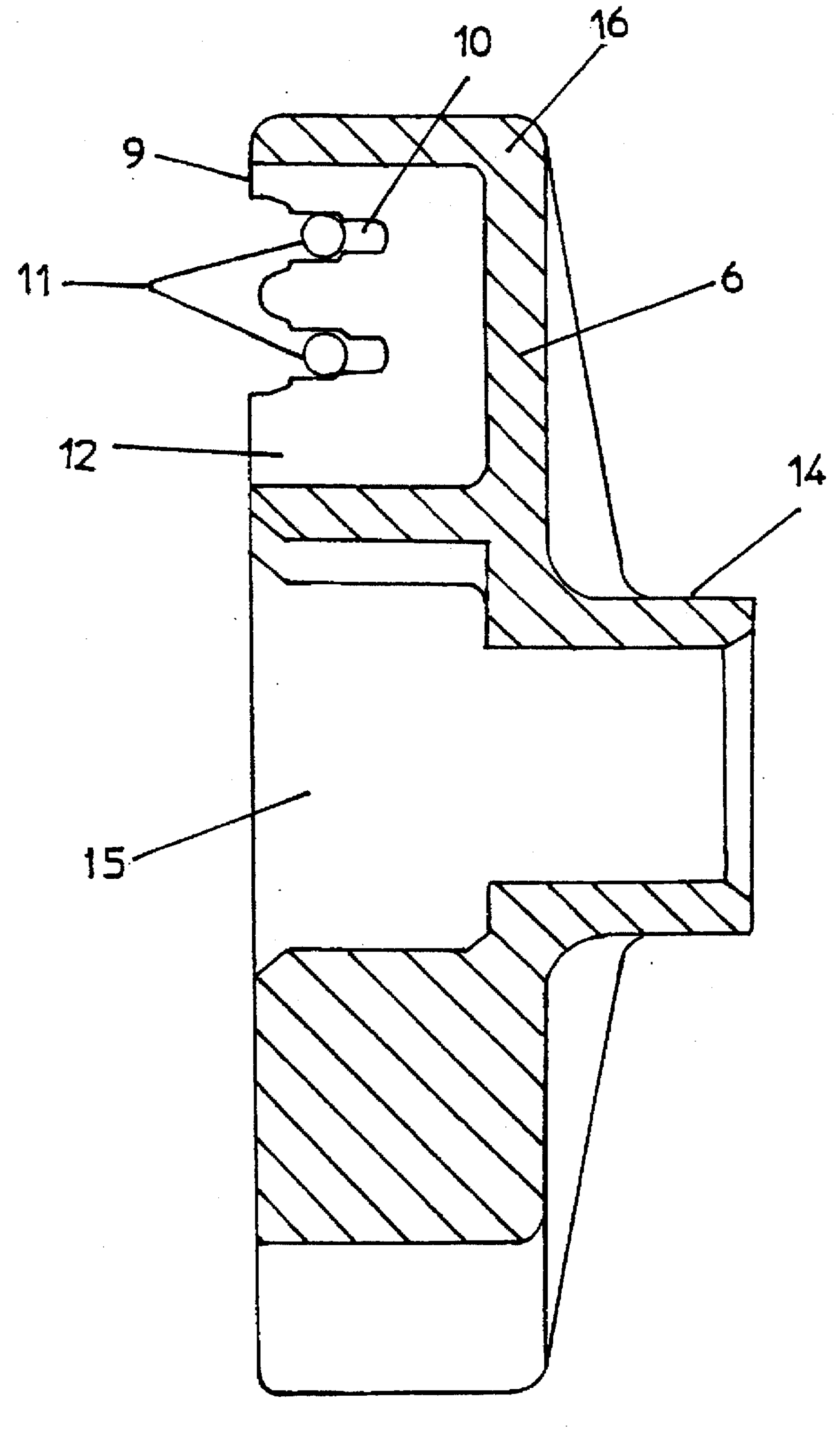
FIG. 11 is a sectional side elevation view of a housing portion of an assembled cylindrical commutator according to an alternative embodiment of the invention.

In an alternative embodiment shown in FIG. 11, terminals 12 can be placed in the circular housing portion 6 before winding of the rotor so that the wire is drawn into each terminal 12 during winding of the rotor rather than inserting the terminals after the rotor has been wound as described with the embodiment of the invention shown in FIGS. 1 and 2. Thus, instead of first inserting the armature leads 11 in the transversely extending slots 10 and then inserting the terminals 12, the terminals 12 are first inserted into the housing portion 6 and then the armature leads 11 are inserted into the terminals 12. With this arrangement, the transversely extending slots 10 and divider 17 can be replaced by a single slot.

Figure 13:
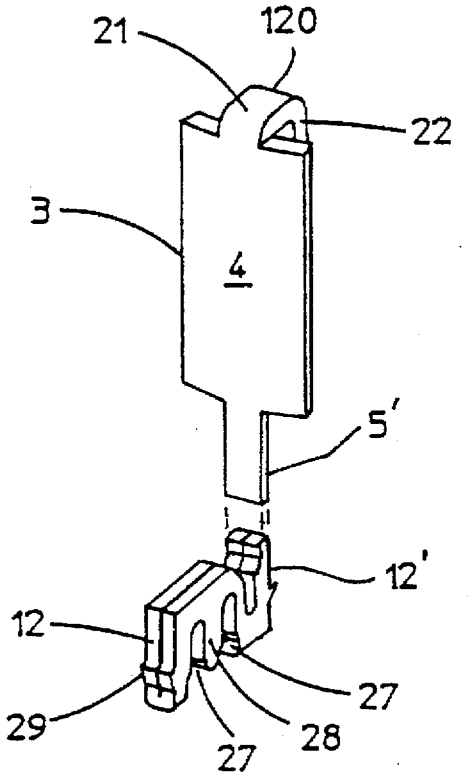
FIG. 13 is a schematic isometric view of a commutator segment and a terminal of an alternative embodiment of the present invention.
Figure 12:
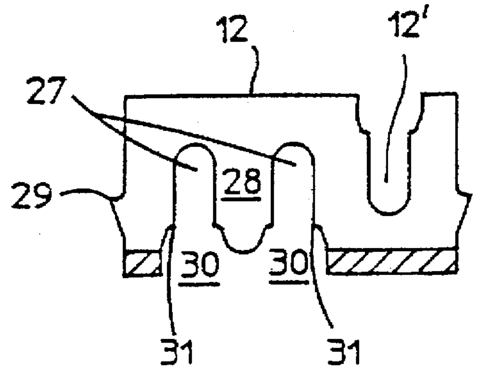
FIG. 12 is a side elevation view of a terminal used in an alternative embodiment of the assembled commutator of the present invention.
Figure 14:
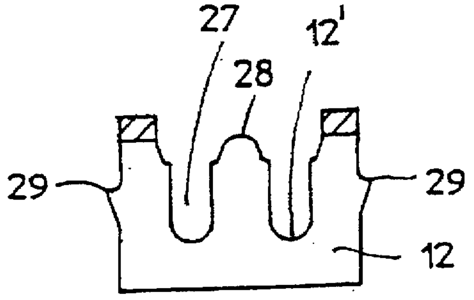
FIG. 14 is a side elevation view of an alternative embodiment of a reverse terminal such as that shown in FIG. 11.

An alternative embodiment of the commutator segments and terminals shown in FIGS. 9 and 10 is shown in FIGS. 12–14. In this alternative embodiment, the commutator segments 3 are formed with a single, preferably rectangular shaped retainer 5' instead of the fork member having two prongs 13 for straddling the terminal 12 as in the embodiment shown in FIGS. 9 and 10. To accommodate the single rectangularly shaped retainer 5' of the commutator segment 3, each terminal 12 is formed with an additional slot 12' adapted to grip the retainer 5' of the commutator segment 3. As shown in FIG. 13, the retainer 5' is inserted into the additional slot 12' and is held therein.

FIG. 14 shows a reverse terminal similar to the terminal shown in FIG. 11 in which one slot 27 receives an armature lead 11 and the other slot 12' receives the retainer 5' of the commutator segment 3.

Figure 15:
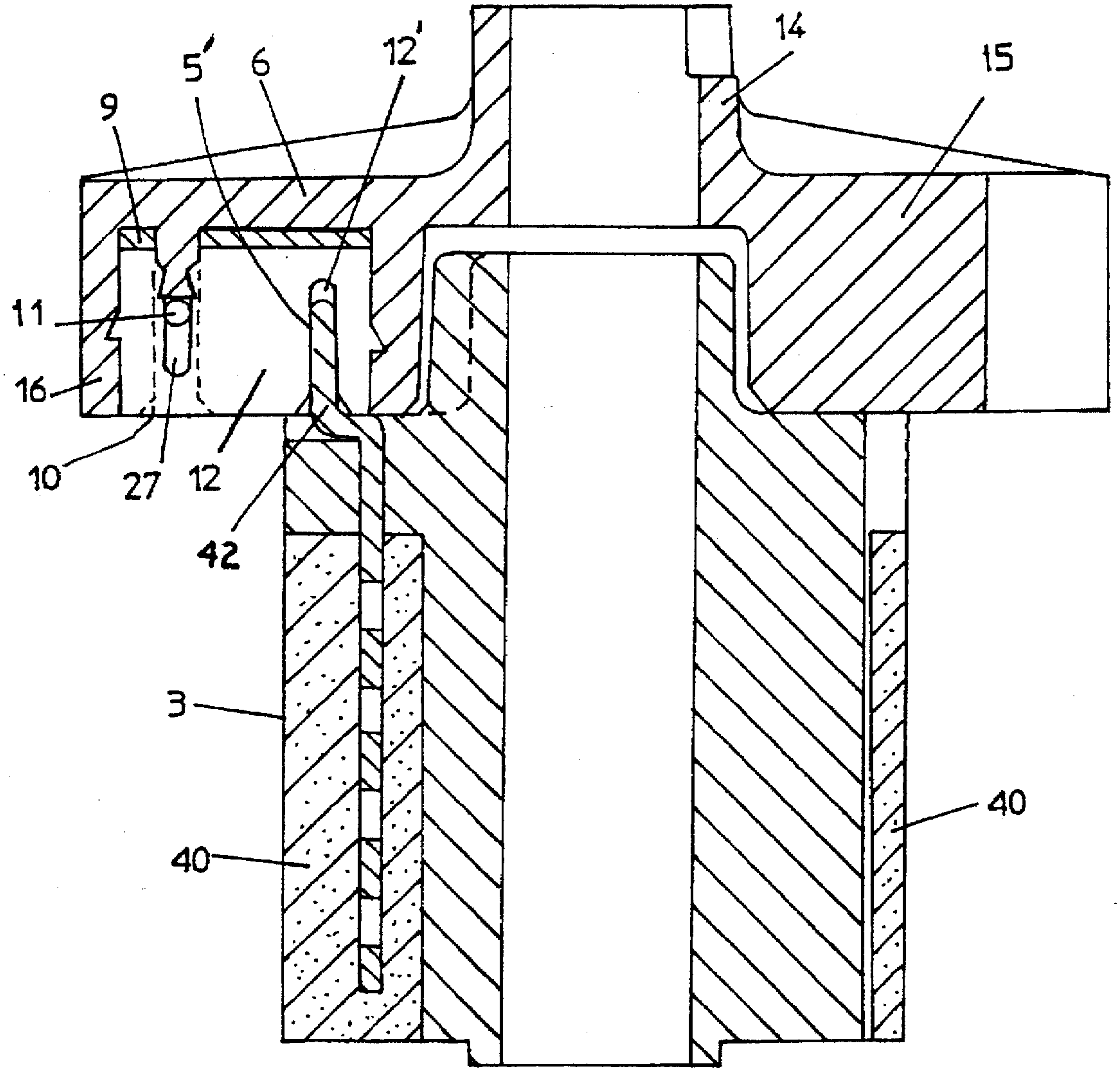
FIG. 15 is a sectional side elevation view of an alternative embodiment of the assembled commutator having a carbon segment commutator.

In an additional alternative embodiment shown in FIG. 15, a commutator segment 3 is provided with a carbon arcuate portion 40 which surrounds a copper connection strip 42 for connecting the terminal 12 to the carbon commutator segment. This embodiment is shown with a prewound housing portion 6 but can be used with reverse terminals as shown in FIG. 11.

Figure 16:
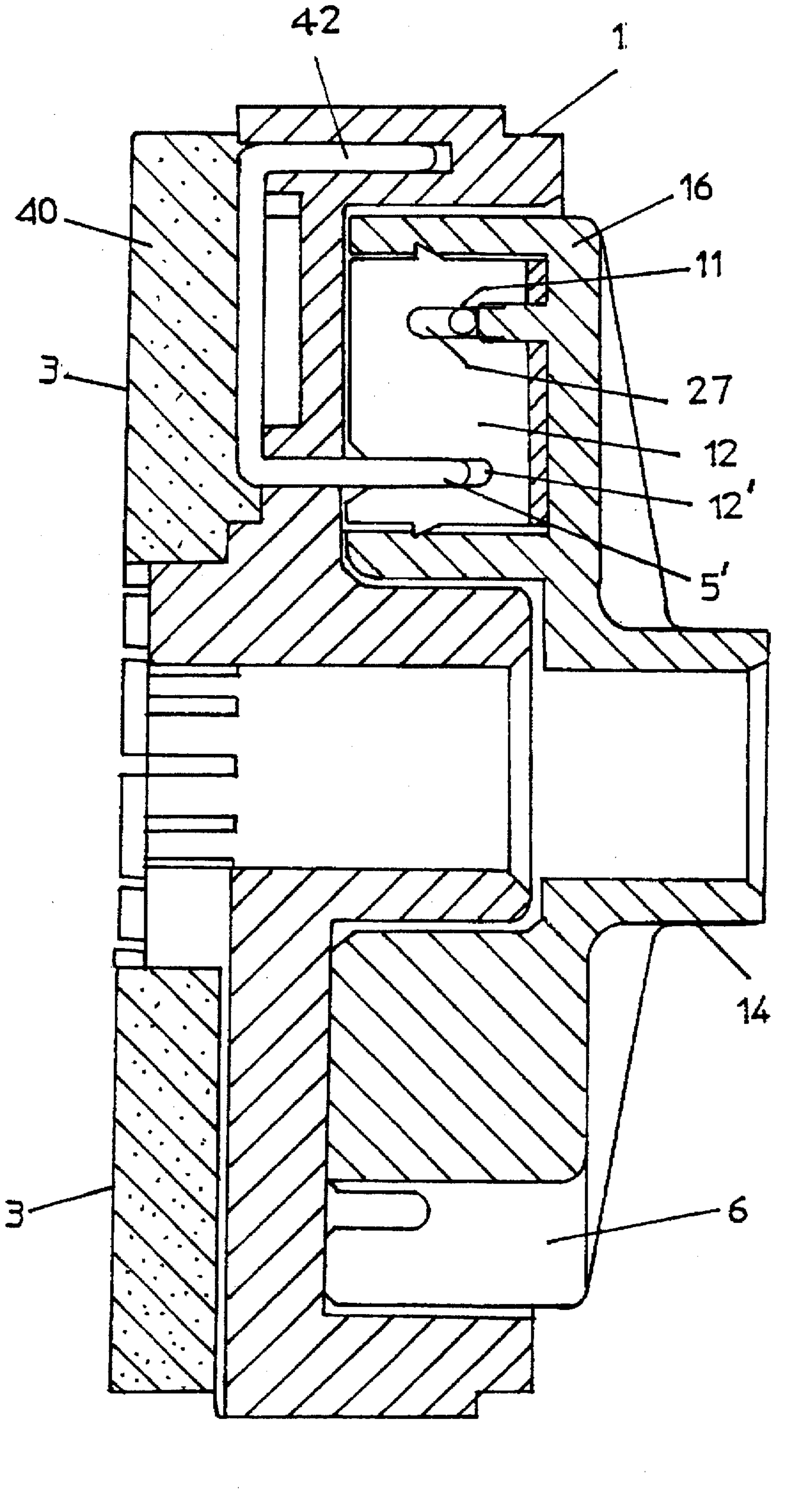
FIG. 16 is a side elevation view of an alternative embodiment of an assembled commutator having a planar carbon commutator.

FIG. 16 shows an alternative embodiment of the assembled commutator of the present invention in which a planar carbon commutator is provided. As seen in FIG. 16, the planar commutator segment 5' has a copper connection lead 42 embedded in a carbon layer 40 forming the brush contact portion. Thus, the carbon layer 40 surrounds the copper connection strip 42 for connecting the terminals to the carbon portion 40 of the commutator segment.

The advantage of the above arrangements shown in FIGS. 11–16 is that the commutators can be standardized in size and provide many combinations of assembled commutators. Different terminals are required for different diameter armature wires and different crowns and bases are required for motors with different number of poles. This also allows a crown to be mated with either a planar type support or a cylindrical type support.

For the carbon segment commutators, this is particularly useful because the carbon segments are fitted to the support base by overmolding with a moldable carbon layer. Copper connection strips are imbedded in the carbon layer to make good electrical contact with the carbon layer with terminal end portions being exposed for mating with the terminals in the crown. As it is impossible to mold the carbon segments on the commutator if the commutator is already fitted to the rotor, especially as the molded carbon requires high temperature curing treatment followed by a cutting process to separate the carbon layer into individual segments, it is important to provide a commutator assembly with a separate segment portion which can be assembled by processing of carbon segments on the segment support portion 1. The segment portion of the commutator as a single unit is then fitted to the rotor and mated with the housing portion 6 to electrically connect the segments to the rotor windings.

Preferably, there is provided an interlocking or guiding means between the crown and the support to prevent relative rotational movement about the axis or rotor shaft. However, axial separation between the two parts may be restricted only by the connection between the terminals and the segments.

Although the present invention has been described in relation to the particular embodiments thereof, many other variations and modifications and other uses will become apparent to those skilled in the art. All such variations and equivalents of the disclosure are considered to be within the fair spirit and scope of the claimed invention.

What is claimed is:

1. An assembled commutator, comprising:

a) a support portion;

b) a plurality of commutator segments mounted on said support portion;

c) a housing connected to said support portion and including a plurality of recesses for receiving armature leads;

d) a plurality of terminals disposed within said housing, each of said terminals including a plurality of slots extending from one side of said terminal for receiving said armature leads, said recesses of said housing and said slots of said terminals being located such that when said armature leads are wound onto said housing and when said terminals are inserted therein, said armature leads are received in said recesses of said housing and said slots of said terminals, each of said terminals further including an additional slot extending from an opposite side of said terminal for receiving a portion of a respective one of said plurality of commutator segments to electrically connect said armature leads to said commutator segments.

2. The assembled commutator of claim 1, wherein said portion of said respective one of said plurality of commutator segments comprises a substantially rectangularly shaped retainer.

3. The assembled commutator of claim 1, wherein said support portion has a plurality of notches formed thereon and each of said plurality of commutator segments includes a hook member disposed in one of said plurality of notches of said support portion.

4. The assembled commutator of claim 1, wherein said housing has a plurality of projections formed thereon and said support portion has a plurality of recesses for receiving said plurality of projections of said housing to connect said housing to said support portion.

5. The assembled commutator of claim 1, wherein said plurality of terminals are formed of a different material than said plurality of commutator segments.

6. The assembled commutator of claim 1, wherein each of a terminals has at least one retaining member formed to fit into one of said plurality of recesses of said housing and engage an inner wall of said one of said plurality of recesses to prevent removal of said terminal.

7. The assembled commutator of claim 1 wherein said plurality of commutator segments include a carbon portion surrounding a connection member.

8. The assembled commutator of claim 2, wherein each of said connection members comprises a copper connection strip.

9. An assembled commutator, comprising:

a) a support portion;

b) a plurality of commutator segments mounted on said support portion;

c) a housing connected to said support portion and including a plurality of recesses for receiving armature leads;

d) a plurality of terminals disposed within said housing, each of said terminals including a plurality of slots extending from one side of said terminal for receiving said armature leads, said recesses of said housing and said slots of said terminals being located such that when said armature leads are wound onto said housing and when said terminals are inserted therein, said armature leads are received in said recesses of said housing and said slots of said terminals, each of said commutator segments including a forked member having two prongs which straddle said terminal and engage said housing for securing said terminal in said housing and electrically connecting said armature leads to said commutator segments.

10. The assembled commutator of claim 9, wherein said support portion has a plurality of notches formed therein and each of said plurality of commutator segments includes a hook member disposed in one of said plurality of notches of said support portion.

11. The assembled commutator of claim 9, wherein said housing has a plurality of projections formed thereon and said support portion has a plurality of complementary recesses for receiving said plurality of projections of said housing to connect said housing to said support portion.

12. The assembled commutator of claim 9, wherein said plurality of terminals are formed of a different material than said connection members.

13. The assembled commutator of claim 9, wherein each of said terminals includes at least one retaining member formed to fit into one of a plurality of recesses of said housing and engage an inner wall of said one of said plurality of recesses to prevent removal of said terminal from said housing.

* * * * *